United States Patent [19]
Kamper

[11] Patent Number: 5,692,269
[45] Date of Patent: Dec. 2, 1997

[54] TIGHTENING RATCHET

[75] Inventor: Hans-Werner Kamper, Würselen, Germany

[73] Assignee: Spanset Inter AG, Oetwil Am See, Switzerland

[21] Appl. No.: 625,847

[22] Filed: Apr. 4, 1996

[30] Foreign Application Priority Data

Apr. 8, 1995 [DE] Germany .................. 295 06 142.1

[51] Int. Cl.⁶ .................................................. B25B 25/00
[52] U.S. Cl. ........................................ 24/68 CD; 24/68 R
[58] Field of Search ................... 24/68 CD, 68 R, 24/68 A, 19

[56] References Cited

U.S. PATENT DOCUMENTS

| | | | |
|---|---|---|---|
| 3,180,623 | 4/1965 | Huber | 24/68 CD |
| 4,542,883 | 9/1985 | Rutzki | 24/68 CD |
| 4,584,742 | 4/1986 | Speich | 24/68 R |
| 5,103,536 | 4/1992 | Kamper | 24/68 CD |
| 5,205,020 | 4/1993 | Kamper | 24/68 CD |

FOREIGN PATENT DOCUMENTS

| | | |
|---|---|---|
| 0 455 085 | 3/1994 | European Pat. Off. |
| 2108616 | 5/1983 | United Kingdom. |

Primary Examiner—Victor N. Sakran
Attorney, Agent, or Firm—Spencer & Frank

[57] ABSTRACT

A tightening ratchet for a lashing strap includes a base body having a central longitudinal direction and one end to which a first end of the lashing strap is fixed. A take-up shaft is rotatably seated on the base body for receiving a second end of the lashing strap and about which the lashing strap can be wound. A releasable tooth adjustment ratchet mechanism is operatively connected to the base body and the take-up shaft for protection against reverse turning of the take-up shaft during a winding of the lashing strap and includes: a ratchet wheel with teeth seated against relative rotation on the take-up shaft; and two ratchet slides seated longitudinally displaceable in two separate guide slits, respectively, in the base body and engaging the teeth of the ratchet wheel. The two ratchet slides are located diametrically opposite each other in relation to the ratchet wheel and have a displacement that is essentially congruent with the central longitudinal direction of the base body.

23 Claims, 2 Drawing Sheets

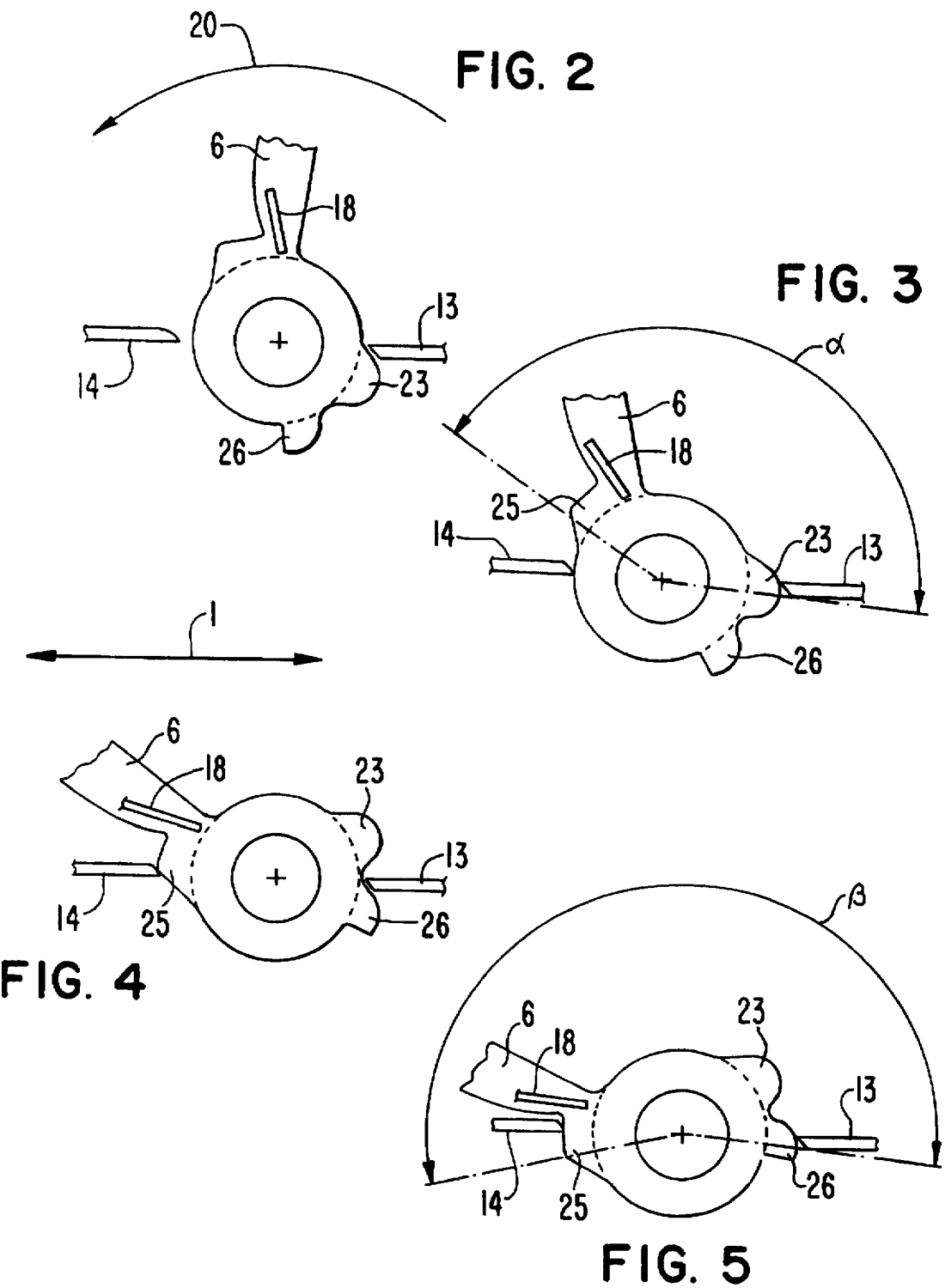

TIGHTENING RATCHET

CROSS-REFERENCE TO RELATED APPLICATIONS

The present application claims the right of priority of German application No. 295 06 142.1, filed Apr. 8, 1995, in Germany, the disclosure of which is incorporated herein by reference.

BACKGROUND OF THE INVENTION

The instant invention relates to a tightening ratchet for a lashing strap including a base body; a take-up shaft rotatably seated on the base body; and a releasable tooth adjustment ratchet mechanism operatively connected to the base body and the take-up shaft for protection against reverse turning of the take-up shaft during tightening of the lashing strap and including a ratchet wheel with teeth seated against relative rotation on the take-up shaft and two ratchet slides seated in separate guides in the base body for longitudinal displacement for engaging the teeth of the ratchet wheel. Such a tightening ratchet is known, for example, from European patent publication EP-A-0 455 085.

According to the disclosure of the above European patent publication, it is possible to gradually loosen the reverse stop ratchet mechanism in steps by moving the tightening lever back and forth. In this known tightening ratchet arrangement, the two ratchet slides of the reverse stop ratchet mechanism are disposed above each other on the base body of the tightening ratchet next to the take-up shaft. To reduce the structural height of the ratchet it is furthermore known from the cited European patent publication to configure the ratchet slides of the ratchet mechanism as curved components.

For small tightening ratchets for lashing straps with small strap widths, the known tightening ratchets provided with curved slides still have a structural height that is too large. The known tightening ratchets then no longer harmoniously blend with the textile lashing strap.

SUMMARY OF THE INVENTION

Starting with the above noted disadvantages, it is an object of the invention to provide a tightening ratchet of the generic type which is as flat as possible.

The above and other objects are accomplished according to the invention by the provision of tightening ratchet for a lashing strap, comprising: a base body having a central longitudinal direction and having one end for fixably attaching a first end of the lashing strap; a take-up shaft rotatably seated on the base body for receiving a second end of the lashing strap and about which the lashing strap can be wound; and a releasable tooth adjustment ratchet mechanism operatively connected to the base body and the take-up shaft for protection against reverse turning of the take-up shaft during a winding of the lashing strap and including: a ratchet wheel with teeth seated against relative rotation on the take-up shaft; and two ratchet slides seated longitudinally displaceable in respectively two separate guides in the base body and engaging the teeth of the ratchet wheel, the two ratchet slides being located diametrically opposite each other in relation to the ratchet wheel and having a displacement that is essentially congruent with the central longitudinal direction of the base body.

Thus, in accordance with the invention, the tightening ratchet is designed so that the two ratchet slides are disposed diametrically opposite each other in relation to the ratchet wheel and the displacement direction of the ratchet slide is essentially congruent wit the center longitudinal direction of the ratchet base body. The invention is based on the consideration that with the known tightening ratchet, the interfering structural height is primarily caused by the slides which are disposed on top of each other. Although a strong curvature of the slides might contribute to a reduction in structural height, it would negatively affect the remaining functional properties of the tightening ratchet. Moreover, large tightening ratchets for tightening straps of great width are already so massive that a certain height of the ratchet can be accepted, while with small tightening ratchets for tightening straps of small strap width, too great a ratchet height creates an interference. However, with a smaller ratchet it is possible to select a greater ratchet length in relation to the ratchet width than with tightening ratchets for larger strap widths.

The straight slides in accordance with the invention which are located opposite each other have the advantage that they need to be moved only translationally and not rotationally. This is of particular advantage with small slide sizes for small tightening ratchets. A merely translatory slide movement favors the sliding behavior of the slides in particular. Furthermore, tilting of the slides is effectively prevented by a purely translatory slide movement. Finally, it is advantageous to guide the ratchet slides in the center longitudinal direction of the base body, because in principle the entire base body length is available as a displacement path for the slides. Since the slides are very flat and their guides accordingly have only a very low interior height, the entire ratchet base body can be made very flat. Further, it is additionally advantageous that in the course of a stepped release of the ratchet mechanism, the locking forces caused by the respective slides are offset by 180° on the ratchet wheel. In this way the locking forces of the ratchet slides are widely distributed over the circumference of the ratchet wheel. Furthermore, following engagement with a ratchet slide, the individual tooth flanks are out of contact over a large circumferential path and therefore can recover, so to speak, from the locking force effects caused by the ratchet slides.

According to a further feature of the invention, there is a material saving with a simple to produce embodiment of the base body. In this case one ratchet slide is, as is generally known in connection with tightening ratchets, seated in the base body next to the ratchet wheel or wheels. The second ratchet slide in accordance with the invention is seated in the fork-like extensions of the lateral walls of the base body on the side of the ratchet wheel facing away from the base ratchet slide. It is particularly advantageous that the basic tool constituting existing small ratchets need only be slightly changed, namely only by addition of the fork-like extension of the lateral walls of the base body.

In accordance with a further aspect of the invention, the ratchet slides are displaceable in the same plane so that an efficient force engagement by the ratchet slides is assured, which also is gentle on the tooth flanks of the ratchet wheel. Further features of the invention relate to an advantageous tightening lever/lifter combination by which on the one hand the lashing strap can be simply and efficiently tightened and, on the other hand, can be loosened again in steps.

According to a structurally simple and production-technologically advantageous embodiment of the invention, the handle bridging the lateral walls of the tightening lever has the dual function of a handle and of a stabilizing transverse connection of the lateral walls of the tightening lever. This embodiment of the tightening lever results in an open construction which advantageously reduces the dead weight of the tightening lever.

Another structurally simple and production-technologically advantageous aspect of the invention relates to the base body of the tightening ratchet in which the base body has a low dead weight which is particularly advantageous in connection with the small tightening ratchets of interest here. By means of the fork-like design of both free ends of the base body, the fixed end of the tightening strap can be easily fixed in place on a bolt bridging the lateral walls of the base body and the take-up shaft also can be easily mounted on the base body. In addition, a symmetrical construction of the tightening ratchet is advantageous. Because of the symmetry it is possible to build numerous elements of the same kind, which reduces the production costs of the tightening ratchet. In addition, according to another aspect of the invention, a symmetrical construction of the tightening ratchet causes a symmetrical force distribution when the tightening force is applied.

Further features of the invention are utilized to prevent accidental change in the tightening direction of the tightening lever from the tightening area to the release area by mistake. The invention additionally permits a safe handling and user-friendly handling of the tightening ratchet. For releasing the tightening tension it is only necessary to pivot the tightening lever into the release area and to move it back and forth between the limit stops in the release area. During each contact of the drive slide with one of the two limit stops the take-up shaft turns back by the amount of half a tooth pitch in the direction opposite the tightening direction, which results in a stepped untightening of the tightening strap.

The ratchet slides can be easily linearly moved between their extreme positions according to further features of the invention. Large forces can furthermore be transferred by the ratchet slides designed according to the invention. Finally, the ratchet slides can be easily installed in guide slits in the base body and form a solid and permanent interlocking connection with the base body.

The invention with further characteristics essential for the invention is described by means of the exemplary embodiments represented in the drawings.

BRIEF DESCRIPTION OF THE DRAWINGS

FIG. 2 is a lateral view of the tooth adjustment ratchet mechanism and the drive tooth adjustment ratchet mechanism in the end position of the tightening lever pivoted away from the housing when tightening the lashing strip.

FIG. 3 is a lateral view of the tooth adjustment ratchet mechanism and the drive tooth adjustment ratchet mechanism in a first release position with the base ratchet slide disengaged by a first release cam.

FIG. 4 is a lateral view of the tooth adjustment ratchet mechanism and the drive tooth adjustment ratchet mechanism in a second release position with the fork ratchet slide disengaged by a second release cam.

FIG. 5 is a lateral view showing a totally released position of the tightening ratchet with both the fork ratchet slide disengaged by the second release cam and the base ratchet slide disengaged by a third release.

DETAILED DESCRIPTION OF THE PREFERRED EMBODIMENTS

Figure 1:
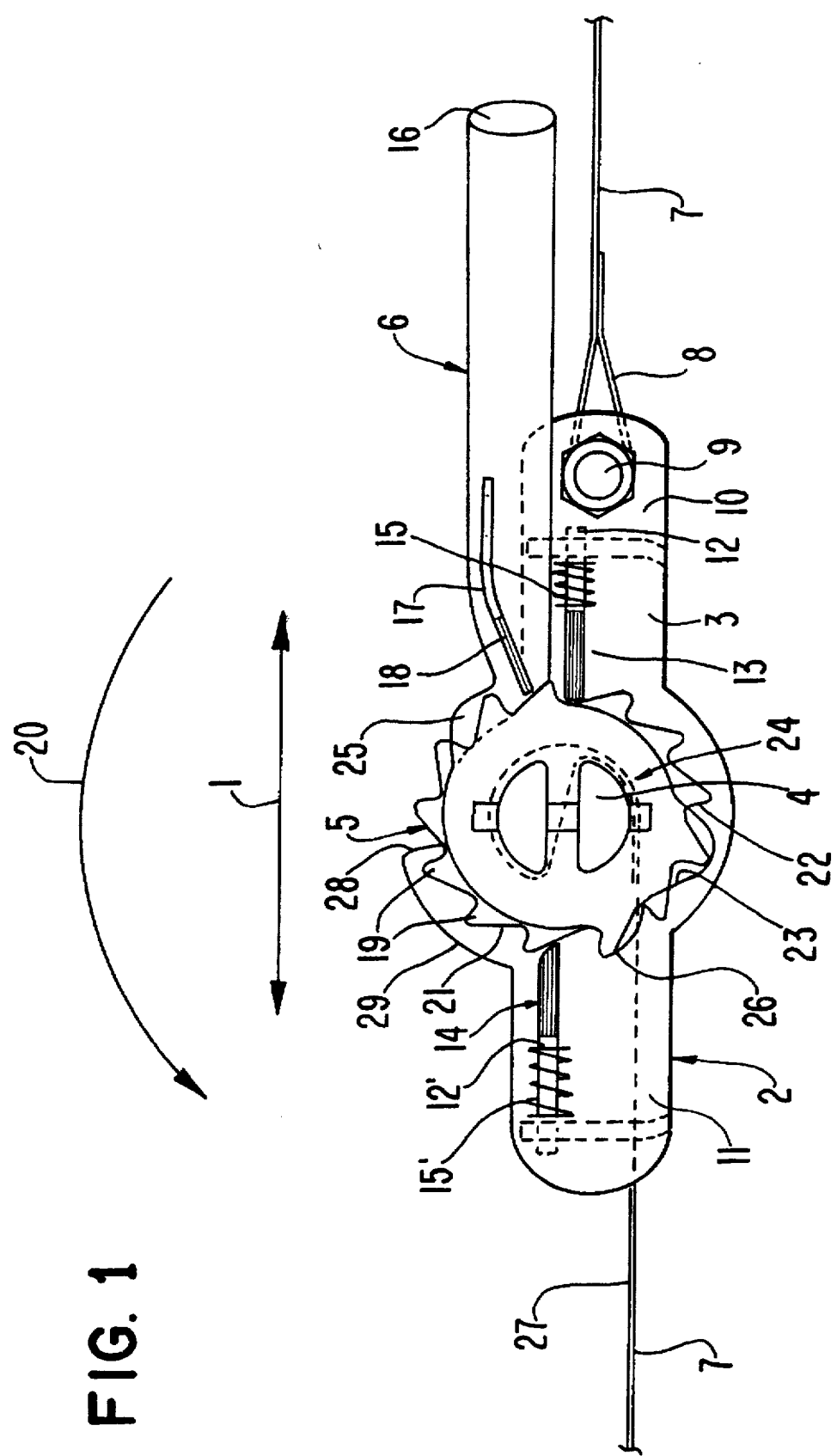
FIG. 1 is a lateral view of a tightening ratchet according to the invention.

Referring to FIG. 1, there is shown a tightening ratchet 2 extending in a central longitudinal direction 1, which essentially consists of a base body 3, a take-up shaft 4 rotatably seated in bearing eyes (not shown) of the base body, two ratchet wheels 5 (only one being shown) fixed in place on respective ends on take-up shaft 4, and a tightening lever 6 pivotably seated on take-up shaft 4. The ratchet wheels each exhibit ratchet teeth 19. A lashing strap 7 has a fixed end provided with a belt loop 8 which is fastened on a threaded bolt 9 that passes through and bridges both lateral base body walls 10, only one being shown, in a transverse direction extending perpendicularly in respect to central longitudinal direction 1. Fork-like extensions 11 (again only one being shown) are formed in the central longitudinal direction 1 on lateral base body walls 10 next to take-up shaft 4. Guide slits 12 for respective base ratchet elides 13 are formed in the lateral base body walls 10. Analogously therewith, guide slits 12' for seating respective fork ratchet slides 14 are cut into fork-like extensions 11. Base ratchet slides 13 and fork ratchet slides 14 can be displaced translatorily in the center longitudinal direction 1 against respective spring assemblies 15 and 15'.

On its free end facing away from take-up shaft 4, tightening lever 6 has a handle 16. A drive slide 18, which also engages teeth 19 of ratchet wheel 5, is displaceably seated in admire slide guidance slit 17. The loose end of the lashing strap 7 is fixed in place in the two-part take-up shaft 4 as shown by the dotted line representation of the lashing strap inside the tightening ratchet. The structural design of the take-up shaft 4 is described in detail in European patent publication EP-A-0 455 085, the disclosure of which is incorporated herein by reference.

For tightening lashing strap 7, drive slide 18 extends behind a ratchet tooth 19 of ratchet Wheel 5. Tightening lever 6 is pivoted counterclockwise in pivoting direction 20 until it has reached an extreme pivot position shown in FIG. 2 for tightening lashing strap 7. In this case the pivoting direction 20 of the tightening lever 6 corresponds to the direction of rotation of ratchet wheel 5 which is the tightening direction of take-up shaft 4. Tightening lever 6 is pivoted back opposite the pivoting direction 20 on base body 2 into its position of rest shown in FIG. 1 for initiating further tightening of lashing strap 7. In this process, drive slide 18 slides over rounded front tooth flanks 21 of ratchet teeth 19 without a corresponding turn of ratchet wheel 5. Then pivot lever 6 is again pivoted from its position of rest shown in FIG. 1 in pivoting direction 20 into the pivot position shown in FIG. 2. In this process, drive slide 18 extends behind a straight tooth flank 22, facing away from the rounded tooth flank 21, of a ratchet tooth 19 and again drives ratchet wheel 5, as well as drive shaft 4 connected therewith fixed against relative rotation, in the tightening direction identical with pivoting direction 20.

For releasing the ratchet mechanism, tightening lever 6 is pivoted in pivoting direction 20 past its tightening position represented in FIG. 2. Because of the further pivoting of pivoting lever 6 past the tightening position shown in FIG. 2, a first release cam 23 at a tightening lever bearing end 24 facing away from handle 16 comes into contact with base ratchet slide 13 so that base ratchet slide 13 is displaced against spring assembly 15 in guide slit 12 in center longitudinal direction 1 as shown in FIG. 3. Because of the displacement of base ratchet slide 13, base ratchet slide 13 is moved out of engagement with teeth 19 of ratchet wheel B, because of which ratchet wheel 5 can turn by half a tooth pitch opposite the tightening direction, that is, opposite pivoting direction 20, until fork ratchet slide 14 extends behind straight tooth flank 22 of a ratchet tooth 19 of ratchet wheel 5. For moving fork ratchet slide 14 out of contact with teeth 19, tightening lever 6 is further turned so that first release cam 23 comes out of engagement with the base ratchet slide 13 and at the same time a second release cam 25 acts on fork ratchet slide 14 and moves it against the spring assembly 15' in guide slot 12' in central longitudinal direction i out of engagement with teeth 19 of ratchet wheel 5 as shown in FIG. 4. In this way ratchet wheel 5 again turns back by half a tooth pitch opposite the tightening direction, until base ratchet slide 13 again extends behind a straight tooth flank 22 of a ratchet tooth 19 of ratchet wheel 5. For further stepped release the tightening lever is moved back opposite the pivoting direction 20 into its position represented in FIG. 3, so that second release cam 25 again releases fork ratchet slide 14, which moves in center longitudinal direction 1 into its initial position in the teeth 19 shown in FIG. 2, while first release cam 23 moves base ratchet slide 13 out of contact with teeth 19 in center longitudinal direction 1, so that take-up shaft 4 and ratchet wheel 5 again move by half a tooth pitch opposite pivot direction 20.

When the tightening tension has been released in steps by the above described stepped release of lashing strap 7, tightening lever 6 can be moved in pivoting direction 20 into its end position represented in FIG. 5 for a complete release of the device. In this end position, second release cam 25 moves fork ratchet slide 14 out of engagement with teeth 19 and a third release cam 26 disposed in the circumferential direction between second release cam 25 and first release cam 23 correspondingly moves base ratchet slide 13 in the central longitudinal direction 1 of engagement with teeth 19. As shown in FIG. 3, an angle α between second release cam 25 and first release cam 23 is approximately 150°. An angle β between second release cam 25 and third release cam 26 is approximately 180° to 200° as shown in FIG. 5.

In the total release position represented in FIG. 5, base ratchet slide 13 and fork ratchet slide 14, as well as drive slide 18, are out of engagement with teeth 19 of ratchet wheel 5, so that by a pulling movement at take-up end 27 of lashing strap 7, take-up shaft 4 can be turned opposite pivoting direction 20 far enough so that take-up end 27 of lashing strap 7 and take-up shaft 4 are out of engagement. In this case the take-up end 27 is the end of the lashing strap 7 which is opposite the belt loop 8.

In its tightening position represented in FIG. 2, drive slide 18 at tightening lever 6 rests against a tightening stop 28 at the base body 3. For pivoting the tightening lever 6 into the release positions represented in FIGS. 3, 4 and 5, the drive slide 18 is lifted over tightening stop 28 and it slides with its front face on a convexly rounded area adjoining tightening stop 28 in the pivoting direction 20 which acts as a sliding guide 29. Tightening stop 28 and adjoining sliding guide 29 are formed in the base body in the circumferential area surrounding the bearing eyes in which take-up shaft 4 is rotatably seated.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A tightening ratchet for a lashing strap, comprising:
   a base body having a central longitudinal direction and having one end for fixably attaching a first end of the lashing strap;
   a take-up shaft rotatably seated on the base body for receiving a second end of the lashing strap and about which the lashing strap can be wound; and
   a releasable tooth adjustment ratchet mechanism operatively connected to the base body and the take-up shaft for protection against reverse turning of the take-up shaft during a winding of the lashing strap and including:
      a ratchet wheel with teeth seated against relative rotation on the take-up shaft; and
         two ratchet slides seated longitudinally displaceable in two separate guide slits, respectively, in the base body and engaging the teeth of the ratchet wheel, the two ratchet slides being located diametrically opposite each other in relation to the ratchet wheel and having a displacement that is essentially congruent with the central longitudinal direction of the base body.

2. A tightening ratchet in accordance with claim 1, wherein the base body is approximately U-shaped having U-legs constituting lateral base body walls which are parallel with each other and have eyes at one end of the base body; the take-up shaft is seated in the eyes of the lateral base body walls; the lateral base body walls are extended fork-like extensions past the eyes at the ends of the take-up shaft of the base body; the guide slit for one of the two ratchet slides is formed in at least one of the lateral base body walls, and the guide slit for the other of the ratchet Slides is formed in at least one of the fork-like extensions.

3. A tightening ratchet in accordance with claim 2, wherein the two ratchet slides are displaceable along the same plane.

4. A tightening ratchet in accordance with claim 2, further comprising a tightening lever pivotally seated on the take-up shaft, the tightening lever including a guide slit and a drive slide longitudinally displaceably seated in the guide slit for engaging the teeth of the ratchet wheel for rotatingly driving the take-up shaft when the tightening lever is pivoted in a tightening direction.

5. A tightening ratchet in accordance with claim 4, wherein the tightening lever includes a bearing end having a circumference with a first release cam disposed thereon for moving the one ratchet slide out of engagement with the teeth of the ratchet wheel, a second release cam disposed on the circumference for moving the other of the two ratchet slides out of engagement with the teeth of the ratchet wheel, the first release cam being disposed on said circumference offset from the second release cam by an angle α of approximately 150° so that, by pivoting the tightening lever back and forth, the two ratchet slides are alternatingly moved out of engagement with the teeth of the ratchet, and a third release cam disposed on said circumference next to the first release cam and offset from the second release cam by an angle β of approximately 180° to 200° for moving the one ratchet slide out of engagement with the teeth of the ratchet while the second release cam simultaneously moves the other of the two ratchet slides out of engagement with the teeth of the ratchet wheel.

6. A tightening ratchet in accordance with claim 5, wherein, in the tightening direction, the second release cam is located ahead of the first release cam and the first release cam is located ahead of the third release cam.

7. A tightening ratchet in accordance with claim 4, wherein the tightening lever comprises lateral tightening lever walls that extend essentially parallel and project fork-like away from the tightening lever bearing end, and a handle bridging the lateral tightening lever walls in a transverse direction parallel with the take-up shaft fixed in place at ends of the tightening lever lateral walls facing away from the tightening lever bearing end.

8. A tightening ratchet in accordance with claim 7, wherein the tightening lever includes a transverse connecting yoke having a shape of a hollow box extending in the transverse direction and open in the direction toward the take-up shaft bridgingly connecting the lateral tightening lever walls with each other.

9. A tightening ratchet in accordance with claim 8, wherein the guide slit comprises at least one guide slit disposed in one of the lateral tightening lever walls and the drive slide comprises at least one drive slide disposed in the at least one guide slit and resting against the transverse connecting yoke under spring pressure, the drive slide having a front face facing away from the take-up shaft and including a gripping bracket for linear displacement in a direction toward the transverse connecting yoke.

10. A tightening ratchet in accordance with claim 4, wherein the tightening lever comprises lateral tightening lever walls that extend essentially parallel to the center longitudinal direction and are disposed symmetrically with respect to the center longitudinal axis.

11. A tightening ratchet in accordance with claim 10, wherein the tightening lever has a rest position resting on the base body in the manner of a cover from which the tightening lever is pivotable in the tightening direction into a position in a range of 80° to 100° relative to the base body, whereby with the drive slide engaged behind a ratchet tooth of the ratchet wheels, the take-up sheet is rotationally driven in the tightening direction.

12. A tightening ratchet in accordance with claim 11, wherein the base body includes a tightening stop radially extending from a surface of the base body in the 80° to 100° range against which the drive slide comes to rest when the tightening lever is pivoted in the tightening position.

13. A tightening ratchet in accordance with claim 12, wherein the tightening lever has an end remote from the take-up shaft and the drive slide is longitudinally displaceable in the guide slit in a direction toward the remote end of the tightening lever for lifting the drive slide out of engagement with the teeth of the ratchet wheel and freeing the drive slide from its rest against the tightening stop so that the tightening lever can be pivoted in the tightening direction beyond the 80° to 100° position.

14. A tightening ratchet in accordance with claim 13, wherein the base body includes a bearing eye circumferential area around at least one of the eyes in the lateral base body walls which adjoins the tightening stop on the base body in the tightening direction and radially projects past a tip diameter of the adjoining ratchet wheel and is convexly rounded so that it forms a sliding guide for a front face of the drive slide facing the ratchet wheel.

15. A tightening ratchet in accordance with claim 14, wherein, with the drive slide front face resting against the sliding guide, the drive slide is simultaneously out of engagement with the teeth of the ratchet wheel and in an inactive position.

16. A tightening ratchet in accordance with claim 14, wherein the base body includes a limit stop extending radially out of the bearing eye circumferential area and the sliding guide comprises a loosening area enclosed in the tightening direction by the tightening stop and the limit stop.

17. A tightening ratchet in accordance with claim 16, wherein the tightening lever and the ratchet mechanism have a first release position in which the drive slide rests against the tightening stop and the first release cam is position to move the one ratchet slide out of engagement with the teeth of the ratchet wheel.

18. A tightening ratchet in accordance with claim 17, wherein the tightening lever and of the ratchet mechanism have a second release position in which the drive slide rests against the limit stop and the second release cam is positioned to move the other of the ratchet slides out of engagement with the teeth of the ratchet wheel.

19. A tightening ratchet in accordance with claim 18, wherein an alternating back and forth movement of the tightening lever between the first and second release positions effects a step-by-step release of the lashing strap.

20. A tightening ratchet in accordance with claim 2, and further including a bolt passing through the lateral base body walls at a free fastening end of the base body, the first end of the lashing strap being fastened to the bolt, wherein the take-up shaft is rotatably seated in the bearing eyes of the lateral base body walls remote from the free fastening end of the base body in the central longitudinal direction.

21. A tightening ratchet in accordance with claim 2, wherein the ratchet wheel comprises two toothed disks supported on the take-up shaft in an area of the lateral base body walls.

22. A tightening ratchet in accordance with claim 1, wherein the two toothed disks and the lateral base body walls are disposed symmetrically with respect to a center longitudinal axis extending in the center longitudinal direction.

23. A tightening ratchet in accordance with claim 1, wherein the two ratchet slides engage respective teeth of the ratchet wheel at a distance separated by half a tooth pitch.

* * * * *